United States Patent
Bauer et al.

(10) Patent No.: US 12,157,437 B2
(45) Date of Patent: Dec. 3, 2024

(54) ROOF CARGO TRAY FOR A MOTOR VEHICLE

(71) Applicant: Dr. Ing. h.c. F. Porsche Aktiengesellschaft, Stuttgart (DE)

(72) Inventors: Markus Alexander Bauer, Dissen a.T.W. (DE); Johannes Herde, Ditzingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 263 days.

(21) Appl. No.: 17/903,248

(22) Filed: Sep. 6, 2022

(65) Prior Publication Data

US 2023/0071785 A1 Mar. 9, 2023

(30) Foreign Application Priority Data

Sep. 8, 2021 (DE) ...................... 10 2021 123 214.7

(51) Int. Cl.
*B60R 9/04* (2006.01)
*B60Q 1/26* (2006.01)

(52) U.S. Cl.
CPC .............. *B60R 9/04* (2013.01); *B60Q 1/2611* (2013.01); *B60Q 1/2661* (2013.01)

(58) Field of Classification Search
CPC ...... B60Q 1/02; B60Q 1/2611; B60Q 1/2661; B60R 9/04; B60R 9/05
USPC ............................................... 296/37.7, 210
See application file for complete search history.

(56) References Cited

U.S. PATENT DOCUMENTS

| 5,207,365 | A | * | 5/1993 | Bott | ...................... B60R 9/00 224/326 |
| 9,713,987 | B2 | * | 7/2017 | Arvidsson | ............... B60R 9/055 |
| 11,279,294 | B2 | * | 3/2022 | Menegazzo | ............. B60R 9/048 |
| 11,648,882 | B2 | * | 5/2023 | Long | ........................ B60R 9/04 224/325 |

FOREIGN PATENT DOCUMENTS

| CN | 206202150 U | | 5/2017 | |
| DE | 202013103414 U1 | * | 10/2013 | ............... B60R 9/04 |
| DE | 102018102316 A1 | * | 8/2018 | ............. B60R 13/07 |

\* cited by examiner

*Primary Examiner* — Jason S Daniels
(74) *Attorney, Agent, or Firm* — Buchanan Ingersoll & Rooney PC

(57) ABSTRACT

A roof cargo tray for a motor vehicle includes a loading surface, which is formed by two outer longitudinal profiles, a plurality of inner longitudinal profiles, two side profiles, a front transverse profile and a rear transverse profile. The side profiles and the transverse profiles delimit the loading surface of the roof cargo tray laterally. The inner longitudinal profiles have identical profile cross sections and include a longitudinal groove and a surface which is located opposite the longitudinal groove and is of closed design. At least one of the inner longitudinal profiles is arranged in a first orientation such that, when the roof cargo tray has been mounted on the motor vehicle, the longitudinal groove faces upward, and wherein at least one of the inner longitudinal profiles is arranged in a second orientation, which is rotated through 180° about a longitudinal axis and in which the longitudinal groove faces downward.

12 Claims, 4 Drawing Sheets

ROOF CARGO TRAY FOR A MOTOR VEHICLE

CROSS-REFERENCE TO RELATED APPLICATION

This application claims priority to German Patent Application No. 10 2021 123 214.7, filed Sep. 8, 2021, the content of such application being incorporated by reference herein in its entirety.

FIELD OF THE INVENTION

The present invention relates to a roof cargo tray for a motor vehicle, comprising a loading surface, which is formed by two outer longitudinal profiles and a plurality of n≥2 inner longitudinal profiles, which extend parallel to one another, two mutually opposite side profiles, which extend parallel to the outer longitudinal profiles, and also a front transverse profile and a rear transverse profile, which are connected to the side profiles, wherein the side profiles and the transverse profiles are formed such that they delimit the loading surface of the roof cargo tray laterally.

BACKGROUND OF THE INVENTION

Different embodiments of roof cargo tray, by means of which loads can be transported on the roof of a motor vehicle, are already known from the prior art. CN 206202150 U, which is incorporated by reference herein, discloses an example of a roof cargo tray of the type in question which has a plurality of longitudinal profiles which form a loading surface of the roof cargo tray.

SUMMARY OF THE INVENTION

A roof cargo tray according to aspects of the invention is distinguished in that the inner longitudinal profiles have identical profile cross sections and comprise a longitudinal groove and a surface which is located opposite the longitudinal groove and is of closed design, wherein at least one of the inner longitudinal profiles is arranged in a first orientation such that, when the roof cargo tray has been mounted on the motor vehicle, the longitudinal groove faces upward, and wherein at least one of the inner longitudinal profiles is arranged in a second orientation, which is rotated through 180° about a longitudinal axis and in which the longitudinal groove faces downward.

The longitudinal grooves which face upward when the roof cargo tray has been mounted in the intended position advantageously make it possible for add-on parts to be attached mechanically to the roof cargo tray, in particular with the aid of corresponding sliding blocks on the add-on parts, these sliding blocks engaging in the longitudinal grooves. If one of the longitudinal profiles has been rotated through 180°, the longitudinal groove, in contrast, faces downward and therefore does not allow mechanical attachment of one or more add-on parts, so that mechanical introduction of forces into the relevant longitudinal profile can advantageously be avoided. Since the inner longitudinal profiles have identical profile cross sections, and therefore are designed in the form of identical parts, this gives rise to production-related advantages, which result in lower production costs. The longitudinal profiles preferably have a rectilinear profile shape. The two side profiles and also the two transverse profiles can preferably be designed in the form of profiles which have undergone two-dimensional roll bending.

In order to extend the functionality of the roof cargo tray, it is possible, in a preferred embodiment, for the longitudinal groove of the inner longitudinal profile which is oriented such that the longitudinal groove faces downward has formed within it an accommodating channel, within which at least one electric connection cable is accommodated.

The roof cargo tray can preferably have at least one covering profile, by means of which the accommodating channel can be closed. As a result, the at least one electric connection cable which is accommodated within the accommodating channel can be protected against external influences. The covering profile can be produced, in particular, from rubber.

In order to provide the roof cargo tray with further functionalities, it is proposed, in an advantageous embodiment, that the roof cargo tray should have at least one lighting device and/or at least one signal device, which is connected to the electric connection cable. The purpose of the lighting device can be, in particular, that, when activated, it improves illumination of an area in front of the motor vehicle. A signal device designed to generate optical and/or acoustic signals can be advantageous, for example, when the roof cargo tray is being used in an emergency or rescue vehicle.

In order to improve the visual appearance and/or to provide the vehicle equipped with the roof cargo tray with further functionalities, it is possible, in one embodiment, for the roof cargo tray to have a cladding arrangement on its front side.

The cladding arrangement can preferably have a lower cover, which is fastened on the front crossmember. The lower cover can, in particular, be adhesively bonded or screwed to the front crossmember of the roof cargo tray.

In a further embodiment, provision can be made for the cladding arrangement to have a front cladding, which is fastened on the lower cover. The front cladding can, in particular, be adhesively bonded or screwed to the lower cover. The front cladding can be designed, for example, such that it forms an accommodating space for the at least one lighting device. For example, the front cladding can be configured such that it forms two light-emitting regions for the at least one lighting device.

In a particularly advantageous embodiment, provision can be made for the roof cargo tray to have three inner longitudinal profiles, wherein the central one of the three inner longitudinal profiles is oriented such that the longitudinal groove faces downward when the roof cargo tray has been mounted in the intended position and the other two longitudinal profiles are oriented such that their longitudinal grooves face upward.

In a preferred embodiment, it is proposed that the outer longitudinal profiles should have identical profile cross sections. This has the advantage that the two outer longitudinal profiles are likewise designed in the form of identical parts, and this therefore gives rise to corresponding advantages during production.

In an advantageous embodiment, it is possible for each of the outer longitudinal profiles to have an outer longitudinal groove, wherein one or more lashing eyes are arranged in the outer longitudinal grooves. The load arranged on the loading surface of the roof cargo tray can be straightforwardly secured by means of the lashing eyes, using corresponding lashing bands or straps. The lashing eyes can preferably be guided in the outer longitudinal grooves of the two outer longitudinal profiles, and the positions thereof can therefore be altered by a user. It is possible here to provide arresting means, by way of which the lashing eyes can be arrested in the desired positions.

BRIEF DESCRIPTION OF THE DRAWINGS

Further features and advantages of the present invention will become clear from the following description of preferred exemplary embodiments, with reference to the accompanying drawings, in which.

DETAILED DESCRIPTION OF THE INVENTION

Figure 1:
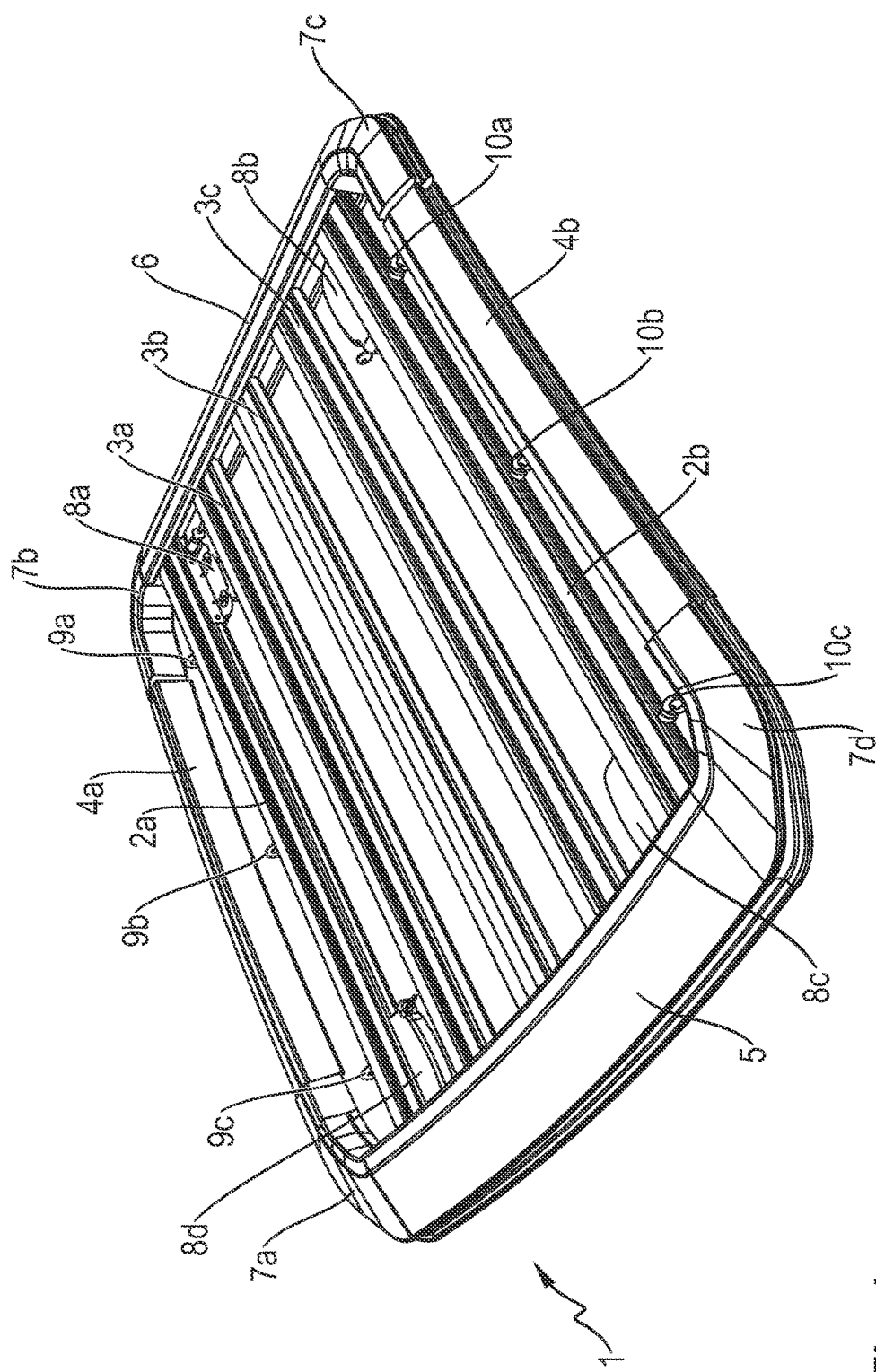
FIG. 1 shows a perspective illustration depicting the basic construction of a roof cargo tray which is designed according to a preferred exemplary embodiment of the present invention.

Referring to FIG. 1, a roof cargo tray 1 which is designed according to a preferred exemplary embodiment of the present invention has two outer longitudinal profiles 2a, 2b and three inner longitudinal profiles 3a, 3b, 3c, which extend parallel to one another and form the loading surface of the roof cargo tray 1. The two outer longitudinal profiles 2a, 2b and the three inner longitudinal profiles 3a, 3b, 3c are each designed in the form of rectilinear profiles. Furthermore, the roof cargo tray 1 comprises two side profiles 4a, 4b and also a front transverse profile 5 and a rear transverse profile 6. In this exemplary embodiment, the two side profiles 4a, 4b and also the two transverse profiles 5, 6 are designed in the form of profiles which have undergone two-dimensional roll bending. The roof cargo tray 1 also has four corner elements 7a, 7b, 7c, 7d, by means of which the two side profiles 4a, 4b are connected to the two transverse profiles 5, 6. The corner elements 7a, 7b, 7c, 7d are preferably designed in the form of castings. The two outer longitudinal profiles 2a, 2 and the three inner longitudinal profiles 3a, 3b, 3c are preferably screwed to the two transverse profiles 5, 6.

Figure 2:
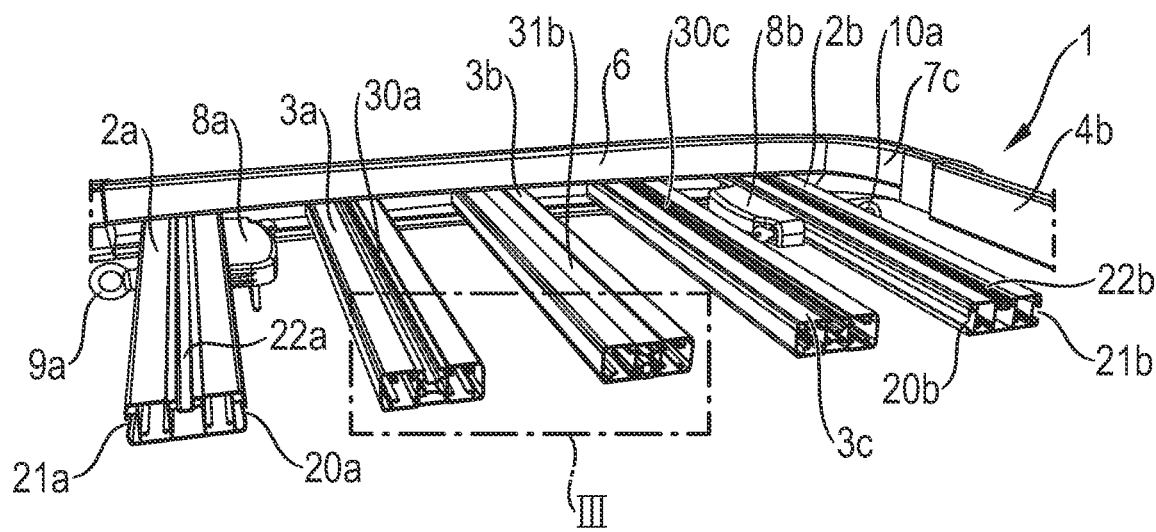
FIG. 2 shows a cross-sectional view of the roof cargo tray according to FIG. 1.

Referring also to FIG. 2, it becomes clear that the two outer longitudinal profiles 2a, 2b have identical cross-sectional shapes with in each case three profile chambers. Each of the two outer longitudinal profiles 2a, 2b has an inner longitudinal groove 20a, 20b, an outer longitudinal groove 21a, 21b and also an upper longitudinal groove 22a, 22b. The inner longitudinal grooves 20a, 20b of each of the two outer longitudinal profiles 2a, 2b each contain two connection devices 8a, 8b, 8c, 8d, which are spaced apart from one another in the longitudinal direction and by means of which the roof cargo tray 1 can be connected to a roof rack or carrier, or to corresponding supporting bars of the motor vehicle, and fastened thereon by way of suitable fastening means. The outer longitudinal grooves 21a, 21b advantageously contain one or more lashing eyes 9a, 9b, 9c, 10a, 10b, 10c, by means of which the load arranged on the loading surface of the roof cargo tray 1 can be secured using corresponding lashing bands or straps. By means of the upper longitudinal grooves 22a, 22b, it is also possible, in particular, for add-on parts to be fitted on the two outer longitudinal profiles 2a, 2b, for example with the aid of correspondingly shaped sliding blocks on the add-on parts, these sliding blocks being formed such that they can be accommodated in an appropriately fitting manner in the upper longitudinal grooves 22a, 22b.

Figure 3:
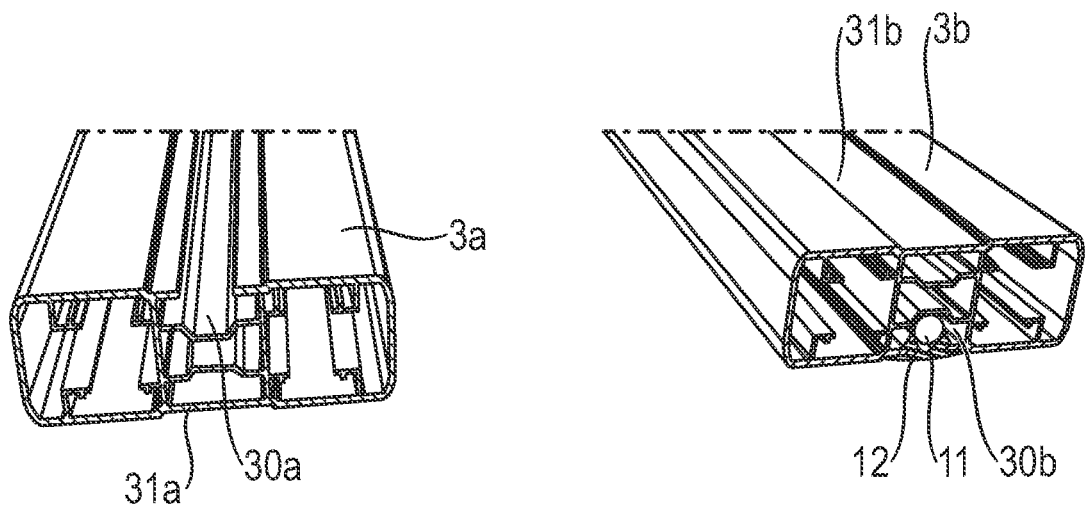
FIG. 3 shows a detail according to III in FIG. 2.

The three inner longitudinal profiles 3a, 3b, 3c likewise have identical profile cross sections and each comprise a longitudinal groove 30a, 30b, 30c. As can be seen in FIG. 2 and in the detail-specific view according to FIG. 3, the central longitudinal profile 3b of the three inner longitudinal profiles 3a, 3b, 3c has been rotated by 180° about its longitudinal axis in relation to the other two longitudinal profiles 3a, 3c. This means that the longitudinal groove 30b of the central longitudinal profile 3b of the three inner longitudinal profiles 3a, 3b, 3c faces downward, whereas the longitudinal grooves 30a, 30c of the other two longitudinal profiles 3a, 3c face upward, and therefore—in a manner analogous to the upper longitudinal grooves 22a, 22b of the outer longitudinal profiles 2a, 2b—add-on parts can be fitted on these longitudinal profiles, for example with the aid of correspondingly shaped sliding blocks on the add-on parts, the sliding blocks being formed such that they can engage in an appropriately fitting manner in the upper longitudinal grooves 30a, 30c of the longitudinal profiles 3a, 3c.

The longitudinal groove 30b of the central longitudinal profile 3b of the three inner longitudinal profiles 3a, 3b, 3c, this longitudinal groove 30b facing downward in the mounted position, forms an accommodating channel, within which at least one electric connection cable 11 can be accommodated. The downwardly facing longitudinal groove 30b of the central longitudinal profile 3b, this longitudinal groove forming the accommodating channel, is closed by means of a covering profile 12, which is preferably produced from rubber.

Figure 4:
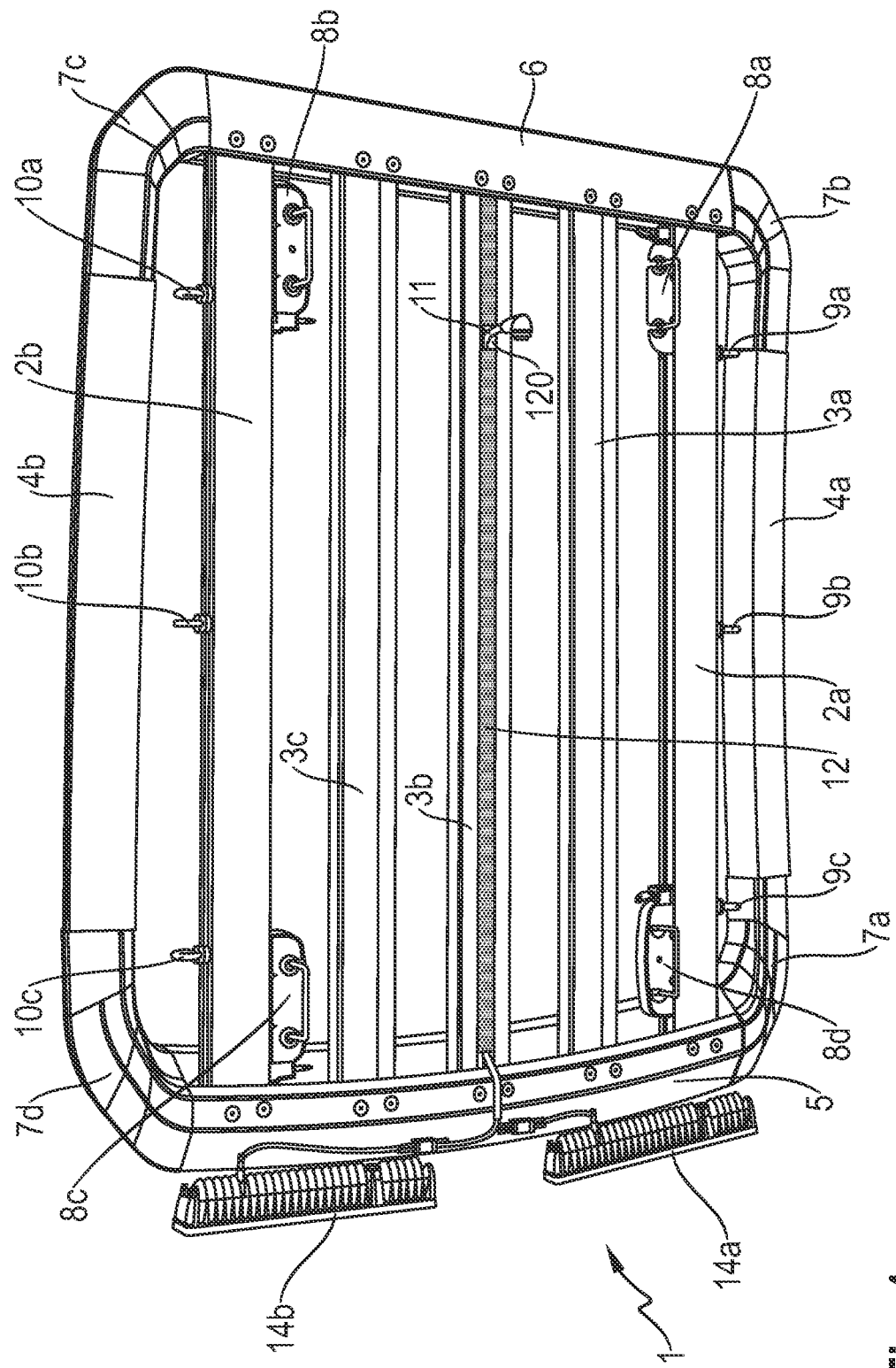
FIG. 4 shows a perspective bottom view of the roof cargo tray with two additional lighting devices.

The electric connection cable 11 can be connected, for example, to one or more lighting devices 14a, 14b, or to other electrical devices, in order to supply these devices with electrical energy. This is shown in detail in FIG. 4. It is clear that the electric connection cable 11, which is accommodated within the longitudinal groove 30b of the central longitudinal profile 3b of the three inner longitudinal profiles 3a, 3b, 3c, is routed outward through a cable feed-through 120 in a rear region of the covering profile 12 and can be connected by means of a plug to an electrical supply device (not shown explicitly here), in particular to a roof plug socket. It is also the case that the electric connection cable 11 is routed out of the longitudinal groove 30b of the central longitudinal profile 3b of the three inner longitudinal profiles 3a, 3b, 3c in a front region. In the exemplary embodiment shown here, the roof cargo tray 1 has two lighting devices 14a, 14b, which are connected to the electric connection cable 11 and are supplied with electrical energy when the electrical power-supply device is in operation.

Referring again to FIGS. 2 and 3, it becomes clear that the central longitudinal profile 3b of the three inner longitudinal profiles 3a, 3b, 3c, when it has been mounted in the intended position, in which the longitudinal groove 30b faces downward, does not have any mechanical attachment points for the load on its surface 31b which is located opposite the longitudinal groove 30b and, in this orientation of the profile, forms the upper side, is of closed design. This has a positive effect on the mechanical stability and structural strength of the roof cargo tray 1, since there is no load being introduced centrally. The longitudinal profile 3a, which is arranged to the left of the central longitudinal profile 3b, has an upwardly facing longitudinal groove 30a and a downwardly facing closed surface 31a.

Figure 5:
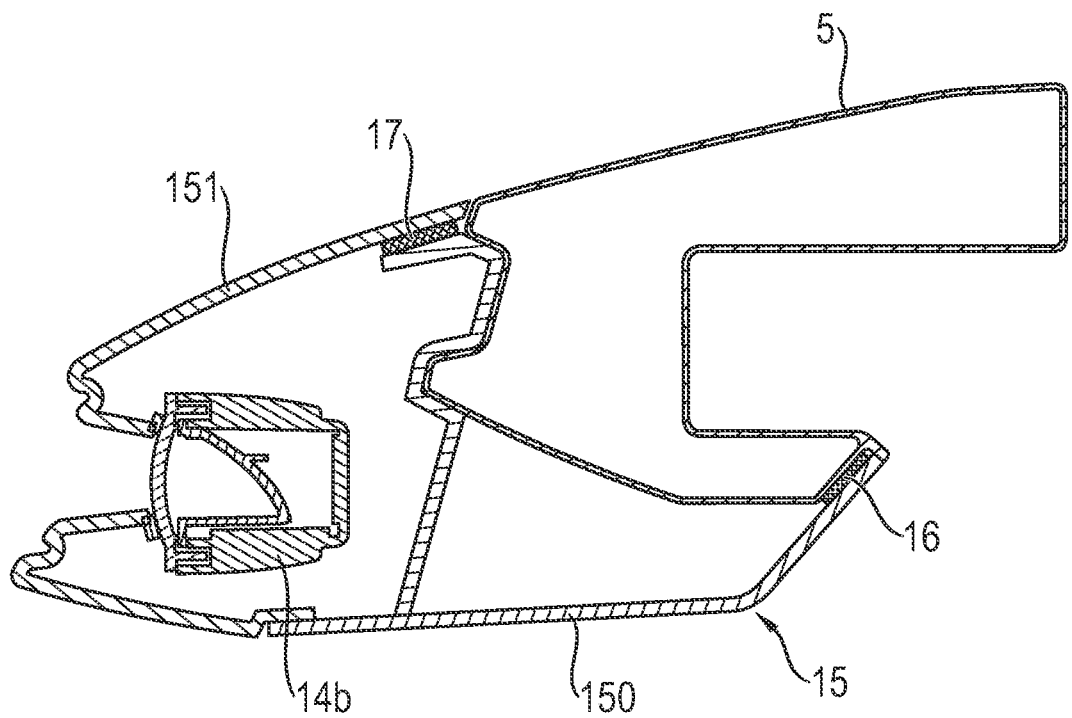
FIG. 5 shows a vertical longitudinal section through a front region of the roof cargo tray, wherein the roof cargo tray has an additional cladding arrangement.
Figure 6:
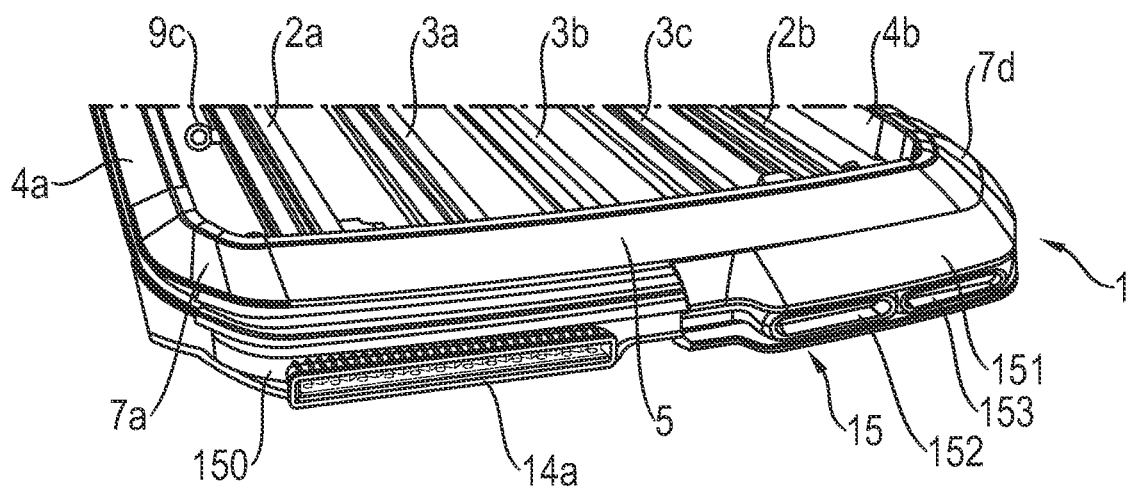
FIG. 6 shows a perspective view of the front region of the roof cargo tray.

Referring also to FIGS. 5 and 6, the roof cargo tray 1 equipped with the lighting devices 14a, 14b can have, on its front side, a cladding arrangement 15, which is preferably of two-part design. The cladding arrangement 15 has a lower cover 150, which is positioned on the front transverse profile 5 and is fastened thereon by way of suitable fastening means. These fastening means can be in the form, for example, of one or more adhesive-bonding elements, in particular of an adhesive-bonding strip 16. As an alternative, it is also possible for the lower cover 150 to be screwed to the front transverse profile 5 or fastened thereon in some other way. The cladding arrangement 15 also comprises a front cladding 151, which is fastened on the lower cover 150 with the aid of suitable fastening means. These fastening means can be, for example, one or more adhesive-bonding elements, in particular an adhesive-bonding strip 17. As an alternative, the front cladding 151 can also be screwed to the lower cover 150 or fastened thereon in some other way. The front cladding 151 is designed such that it forms an accommodating space for each of the two lighting devices 14a, 14b. As indicated on the right-hand side of FIG. 6, the front cladding 151 is configured such that it forms in each case two light-emitting regions 152, 153 for each of the two lighting devices 14a, 14b. That part of the front cladding 151 which covers the first lighting device 14a has been omitted from FIG. 6.

What is claimed is:

1. A roof cargo tray for a motor vehicle, said roof cargo tray comprising:
    a loading surface, which is formed by (i) two outer longitudinal profiles and (ii) a plurality of more than two inner longitudinal profiles, wherein the outer longitudinal profiles and the inner longitudinal profiles extend parallel to one another;
    two mutually opposite side profiles, which extend parallel to the outer longitudinal profiles; and
    a front transverse profile and a rear transverse profile, which are each connected to the side profiles,
    wherein the side profiles and the front and rear transverse profiles delimit the loading surface of the roof cargo tray,
    wherein the inner longitudinal profiles have identical profile cross sections and each comprise a longitudinal groove and a closed surface which is located opposite the longitudinal groove,
    wherein a first inner longitudinal profile of the inner longitudinal profiles is arranged in a first orientation such that, when the roof cargo tray has been mounted on the motor vehicle, the longitudinal groove of said first inner longitudinal profile faces upward,
    wherein a second inner longitudinal profile of the inner longitudinal profiles is arranged in a second orientation, which is rotated by 180° about a longitudinal axis with respect to the first orientation, and wherein the longitudinal groove of said second inner longitudinal profile faces downward, and
    wherein the longitudinal groove of the second inner longitudinal profile has an accommodating channel within which at least one electric connection cable is accommodated.

2. The roof cargo tray as claimed in claim 1, wherein the roof cargo tray has at least one covering profile that closes the accommodating channel.

3. The roof cargo tray as claimed in claim 1, wherein the roof cargo tray has at least one lighting device and/or at least one signal device, which is connected to the electric connection cable.

4. The roof cargo tray as claimed in claim 1, further comprising a cladding arrangement arranged on a front side of the roof cargo tray.

5. The roof cargo tray as claimed in claim 1, wherein the roof cargo tray has three inner longitudinal profiles, wherein a central one of the three inner longitudinal profiles is oriented such that the longitudinal groove faces downward when the roof cargo tray has been mounted and the other two longitudinal profiles are oriented such that their longitudinal grooves face upward.

6. The roof cargo tray as claimed in claim 1, wherein the outer longitudinal profiles have identical profile cross sections.

7. A motor vehicle comprising the roof cargo tray of claim 1.

8. A roof cargo tray for a motor vehicle, said roof cargo tray comprising:
    a loading surface, which is formed by (i) two outer longitudinal profiles and (ii) a plurality of more than two inner longitudinal profiles, wherein the outer longitudinal profiles and the inner longitudinal profiles extend parallel to one another;
    two mutually opposite side profiles, which extend parallel to the outer longitudinal profiles;
    a front transverse profile and a rear transverse profile, which are each connected to the side profiles; and
    a cladding arrangement arranged on a front side of the roof cargo tray, wherein the cladding arrangement has a lower cover fastened on the front transverse profile,
    wherein the side profiles and the front and rear transverse profiles delimit the loading surface of the roof cargo tray,
    wherein the inner longitudinal profiles have identical profile cross sections and each comprise a longitudinal groove and a closed surface which is located opposite the longitudinal groove,
    wherein a first inner longitudinal profile of the inner longitudinal profiles is arranged in a first orientation such that, when the roof cargo tray has been mounted on the motor vehicle, the longitudinal groove of said first inner longitudinal profile faces upward,
    wherein a second inner longitudinal profile of the inner longitudinal profiles is arranged in a second orientation, which is rotated by 180° about a longitudinal axis with respect to the first orientation, and wherein the longitudinal groove of said second inner longitudinal profile faces downward.

9. The roof cargo tray as claimed in claim 8, wherein the cladding arrangement has a front cladding fastened on the lower cover.

10. A motor vehicle comprising the roof cargo tray of claim 8.

11. A roof cargo tray for a motor vehicle, said roof cargo tray comprising:
    a loading surface, which is formed by (i) two outer longitudinal profiles and (ii) a plurality of more than two inner longitudinal profiles, wherein the outer longitudinal profiles and the inner longitudinal profiles extend parallel to one another;
    two mutually opposite side profiles, which extend parallel to the outer longitudinal profiles;
    a front transverse profile and a rear transverse profile, which are each connected to the side profiles; and wherein the side profiles and the front and rear transverse profiles delimit the loading surface of the roof cargo tray, wherein the inner longitudinal profiles have identical profile cross sections and each comprise a longitudinal groove and a closed surface which is located opposite the longitudinal groove, wherein a first inner longitudinal profile of the inner longitudinal profiles is arranged in a first orientation such that, when the roof cargo tray has been mounted on the motor vehicle, the longitudinal groove of said first inner longitudinal profile faces upward, wherein a second inner longitudinal profile of the inner longitudinal profiles is arranged in a second orientation, which is rotated by 180° about a longitudinal axis with respect to the first orientation, and wherein the longitudinal groove of said second inner longitudinal profile faces downward, wherein each of the outer longitudinal profiles has an outer longitudinal groove, wherein one or more lashing eyes are arranged in the outer longitudinal grooves.

12. A motor vehicle comprising the roof cargo tray of claim 11.

\* \* \* \* \*